(12) United States Patent
Frank

(10) Patent No.: US 6,774,857 B2
(45) Date of Patent: Aug. 10, 2004

(54) METHOD FACILITATING INTER-MODE HANDOFF

(75) Inventor: Michael L. Frank, Los Gatos, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 98 days.

(21) Appl. No.: 10/242,226

(22) Filed: Sep. 12, 2002

(65) Prior Publication Data
US 2004/0052272 A1 Mar. 18, 2004

(51) Int. Cl.[7] .......................... H01Q 1/24; H04L 12/43
(52) U.S. Cl. ................ 343/702; 370/335; 370/458; 370/468; 370/441
(58) Field of Search ................... 343/702, 850; 370/335, 441, 458, 468

(56) References Cited

U.S. PATENT DOCUMENTS 5,267,234 A * 11/1993 Harrison ............... 370/281
2003/0189910 A1 * 10/2003 Yamada et al. ......... 370/335

* cited by examiner

Primary Examiner—Hoang V. Nguyen
(74) Attorney, Agent, or Firm—Pamela Lau Kee

(57) ABSTRACT

A cellular handset supports simultaneous service for different frequency ranges, and different wireless standards.

14 Claims, 6 Drawing Sheets

METHOD FACILITATING INTER-MODE HANDOFF

BACKGROUND

Cellular phones (handsets) are increasing in complexity as handsets incorporate more types of service. In the United States, it is typical for a handset to work with both Code Division Multiple Access (CDMA) type modulation as well as the older Frequency Modulation (fm) type signals. These different modulation schemes both coexist in the same signal band and exist in different bands. The handset must be able to transition from one to the other. New handsets will be required to work with both CDMA and GSM type modulation schemes, and be able to transition from one to the other.

There are four major GSM standards. The low band contains two standards: GSM 850 and GSM 900. The high band also contains two standards: GSM 1800 and GSM 1900. GSM 850 operates in the United States, in the cellular band. Transmission (Tx) is 824 to 849 MHz, reception (Rx) is 869 to 894 MHz. GSM 900 operates in Europe, with Tx from 890 to 915 MHz, and Rx from 935 to 960 MHz. GSM 1800, also known as DCS, also operates in Europe. Tx is from 1710 to 1785 MHz, Rx from 1805 to 1880 MHz. GSM 1900 operates in the United States in the PCS band, with Tx from 1850 to 1910 MHz, Rx from 1930 to 1990 MHz. The modulation scheme WCDMA operates in most of the world (with the US the major exception), in the UMTS band. Tx is from 1920 to 1980 MHz, Rx from 2110 to 2170 MHz.

Groupe Speciale Mobile (GSM) type phones are becoming the defacto global standard. Consequently, handsets that enable the GSM scheme must also support other schemes. To illustrate, $3^{rd}$ Generation (3G) handsets must support both GSM and WCDMA. Both modes operate simultaneously, communicating in one mode and searching for service in another. Prior art architecture requires complex timing to avoid self interference.

As shown in FIG. 1, current 3G front-end circuits consist of two main components: the switch and the filters. The switch toggles between transmission (Tx) and reception (Rx) in either GSM mode or to the duplexer for the WCDMA in the UMTS band After the antenna receives the signal, the signal path is split into two by the diplexer. In the simplest form, the diplexer is a pair of filters: one low pass to select for the low GSM bands, and one high pass to select for the high GSM bands and UMTS. The signals are separated an octave in frequency, making the diplexer a simple and inexpensive component.

Positioned on either side of the diplexer are switches that further determine which path is connected to the antenna. For GSM, either the transmitter or the receiver is engaged. For WCDMA, both Tx and Rx are on concurrently and must be kept distinct with a duplexer. Conceptually the same as a diplexer, a duplexer is more complex as it has the requirements of separating two signals in that are very close in frequency.

In FIG. 1, the handset can operate in three modes: GSM 900, GSM 1800, or WCDMA. In addition, the diplexer enables the handset to operate in GSM 900 while looking for service in WCDMA or operate in WCDMA while looking for service in GSM 900. Since there is no filtering between them, the handset cannot simultaneously operate in GSM 1800 and WCDMA.

The circuit shown in FIG. 2 supports GSM in four frequency bands. This allows the handset to operate in North America as well as the rest of the world. The UMTS spectrum was not allocated in North America, and so the handset can only operate in the GSM mode there.

SUMMARY

A cellular handset supports simultaneous service for different frequency ranges, and different wireless standards. The handset includes an antenna connected to a bandpass filter and a first notch filter. The bandpass filter passes the receive band of the UMTS band. A diplexer connects to the output of the first notch filter and several antenna switches. In a first signal path, the antenna switch connects either the transmission or the reception for GSM 900. In a second signal path, the antenna switch connects to a second notch filter and a duplexer. The second filter passes the transmit band of GSM 1800. The duplexer passes the transmit band of UMTS and the receive band of GSM 1800.

Alternatively, the handset includes an antenna connected to a bandpass filter and a first notch filter. The bandpass filter passes the receive band of the UMTS band. A diplexer connects to the output of the notch filter and several antenna switches. In a first signal path, the antenna switch connects either the transmission of GSM 850/900, GSM 850 reception, or GSM 900 reception. In a second signal path, the antenna switch connects to a second notch filter, GSM 1900 reception, and a duplexer. The second notch filter passes the transmit bands of GSM 1800/1900. The duplexer passes the transmit band of UMTS and the receive band of GSM 1800.

Alternatively, the handset is as above, but the diplexer includes a notch filter.

DETAILED DESCRIPTION

A cellular handset supports simultaneous service for different frequency ranges, and different wireless standards.

Figure 1:
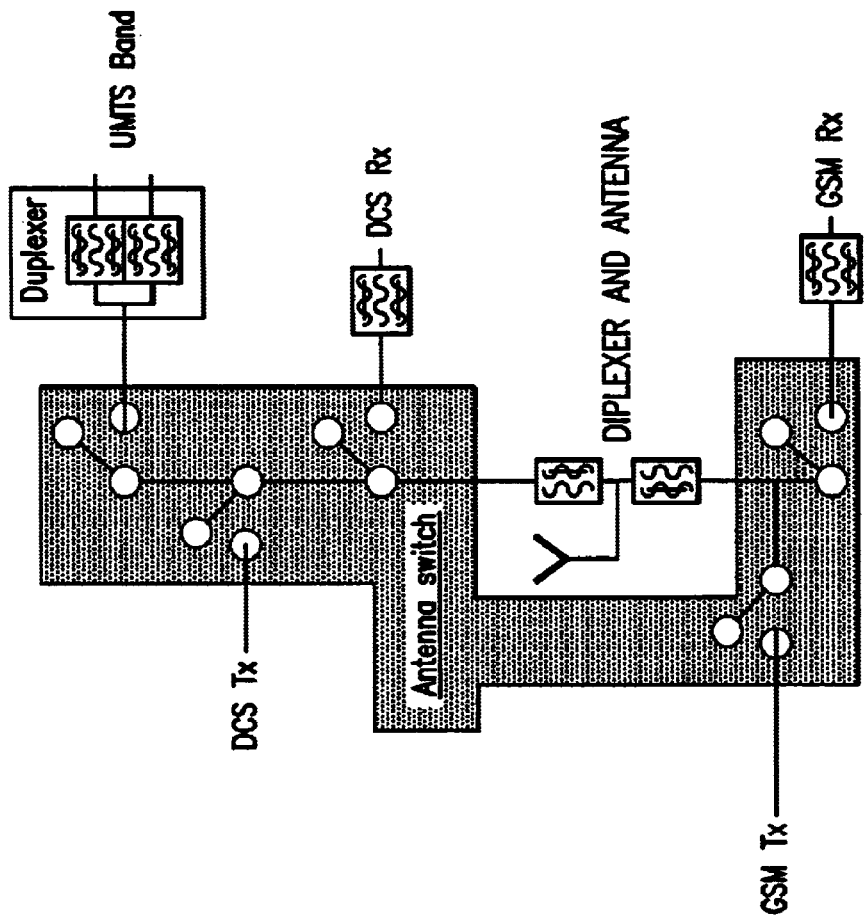
FIG. 1 illustrates a circuit topology for a prior art handset.
Figure 2:
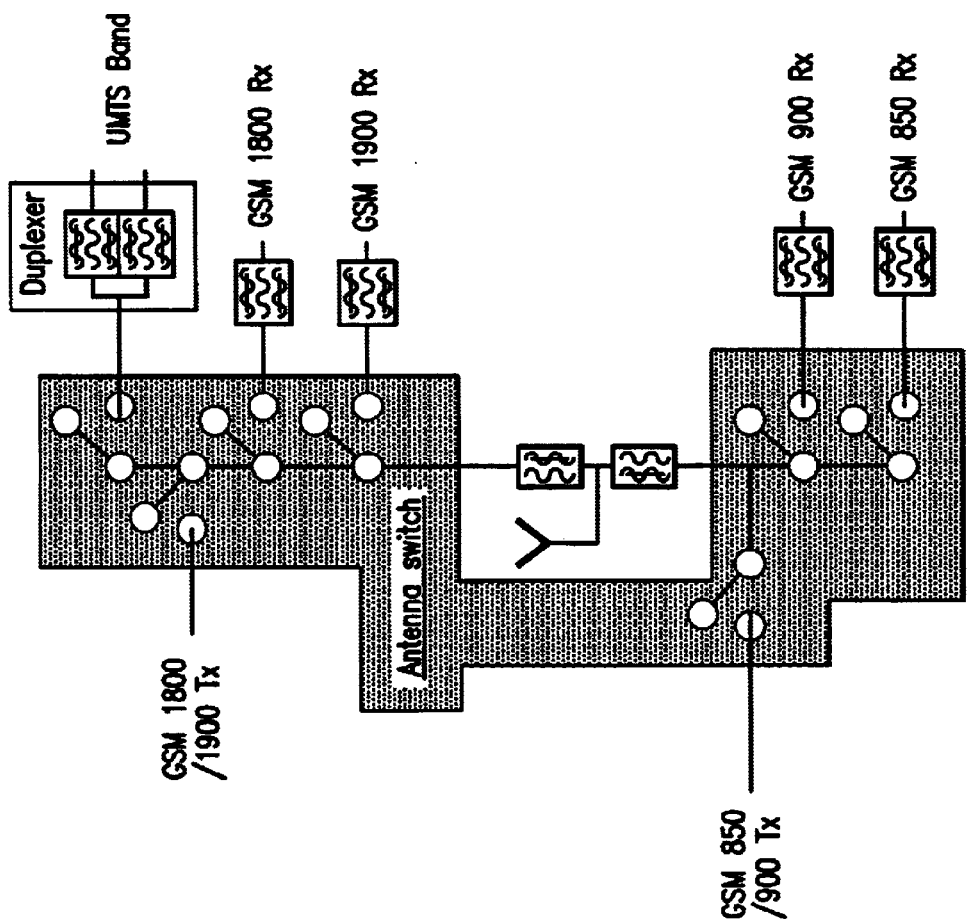
FIG. 2 illustrates a circuit topology for a prior art handset.
Figure 3:
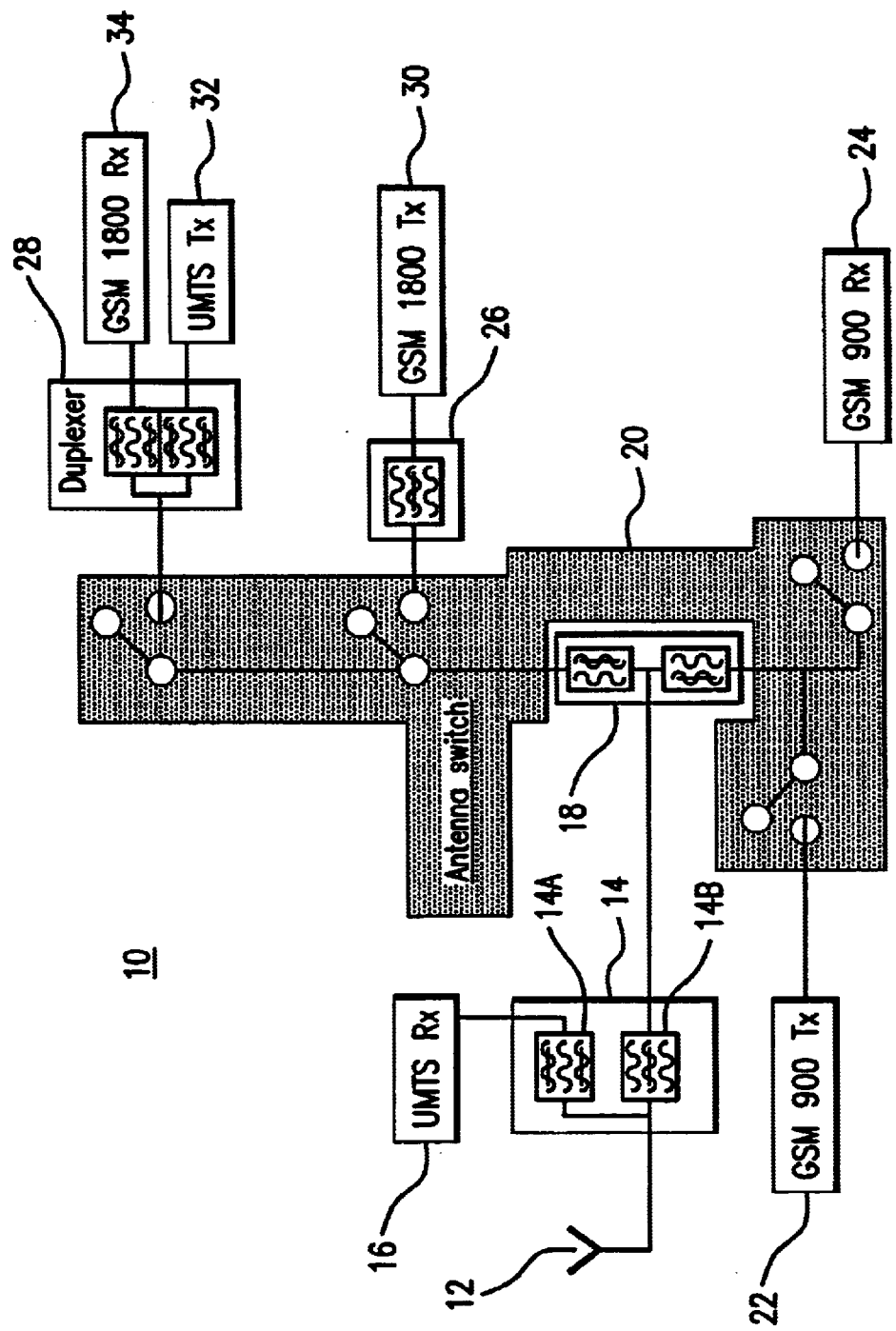
FIG. 3 illustrates a circuit topology for the present invention.

FIG. 3 illustrates an embodiment 10 of the present invention. An antenna 12 is connected to a combination filter 14. The combination filter 14 includes a bandpass filter 14A and a first notch filter 14B. The bandpass filter 14A connects to a UMTS receiver 16. A diplexer 18 connects to the output of the first notch filter 14B and an antenna switch 20. In a first signal path, the antenna switch 20 connects either a GSM 900 transmitter 22 or a GSM 900 receiver 24. In a second signal path, the antenna switch 20 connects to a second notch filter 26 and a duplexer 28. The second notch filter 26 further connects to a GSM 1800 transmitter 30. The duplexer 28 is connected to a UMTS transmitter 32 and a GSM 1800 receiver 34.

In this embodiment, there are three new filtering components. The first is the duplexer 28 for distinguishing UMTS Tx (1920 MHz to 1980 MHz) and GSM 1800 Rx (1805 MHz to 1880 MHz). A duplexer is by definition a structure that allows for simultaneous transmission and reception. In this case, the duplexer consists of two paired band pass filters. One filter passes the UMTS Tx and rejects strongly in GSM 1800 Rx, the other conversely passes the GSM 1800 Rx and rejects strongly the UMTS Tx. When the handset is operating in the UMTS mode and looking for service in DCS, both bands are occupied. The noise generated in the UMTS transmitter in the GSM 1800 Rx band must be prevented from swamping the DCS receiver. The signal power out of the transmitter must be sufficiently attenuated in the receive path to not desensitize the receiver. This duplexer performs both functions.

The second new filtering component is the acoustic resonator-based notch filter 26. The notch filter passes the entire transmit frequency range of the power amplifier (not shown) from 1710 MHz to 1910 MHz while rejecting the UMTS Rx band of 2110 MHz to 2170 MHz. A bandpass filter would require a very high quality factor (Q) to perform this function without excessive loss at the band edges. However, a notch filter has band edges only around the reject band and so has no edge effects in the transmit band. This filter thus allows the handset to use a standard power amplifier.

The third new filtering component is the combination notch and bandpass filter 14 between the antenna switch 20 and the antenna 12. This combination filter passes all the relevant frequencies for the handset, with the exception of the UMTS Rx. Thus, the notch has a passband of more than 810 MHz to 1980 MHz. A passband this wide is not easily achieved with a bandpass structure.

In the combination component, the notch filter performs two important functions. When the handset is engaged in a DCS call, it may search for UMTS coverage. During this search the handset will toggle between transmission and reception. This toggling has the potential to change the impedance of the antenna port. If the impedance change takes place in the UMTS Rx band, the ability of the UMTS receiver to discriminate the signal from the base station is diminished significantly. The primary function of this notch is to insulate the UMTS receiver from any load changes due to switching between Rx and Tx in a DCS call. Secondarily, the notch filter attenuates any noise generated by the handset, in the UMTS Rx band, thus shielding the UMTS receiver from this interference. The bandpass filter has the opposite characteristic. This filter passes the UMTS Rx band and rejects everything else. In concert, the two filters separate the UMTS band from the rest of the radio spectrum important to cell phone operation.

In operation, the UMTS Rx is always available. During a UMTS call, the antenna switch connects the DCS Rx/UMTS Tx duplexer to the antenna. In this mode, one can also search for DCS and/or GSM service. In a DCS call, the antenna switch connects the DCS Tx path or the DCS Rx/UMTS Tx duplexer to the antenna. The handset toggles between the two, one way receiving, one way transmitting. In either state, the handset can also receive UMTS and search for service. The handset can also look for GSM service. Similarly, the handset can engage in a GSM call and search for service in either DCS and/or UMTS.

Figure 4:
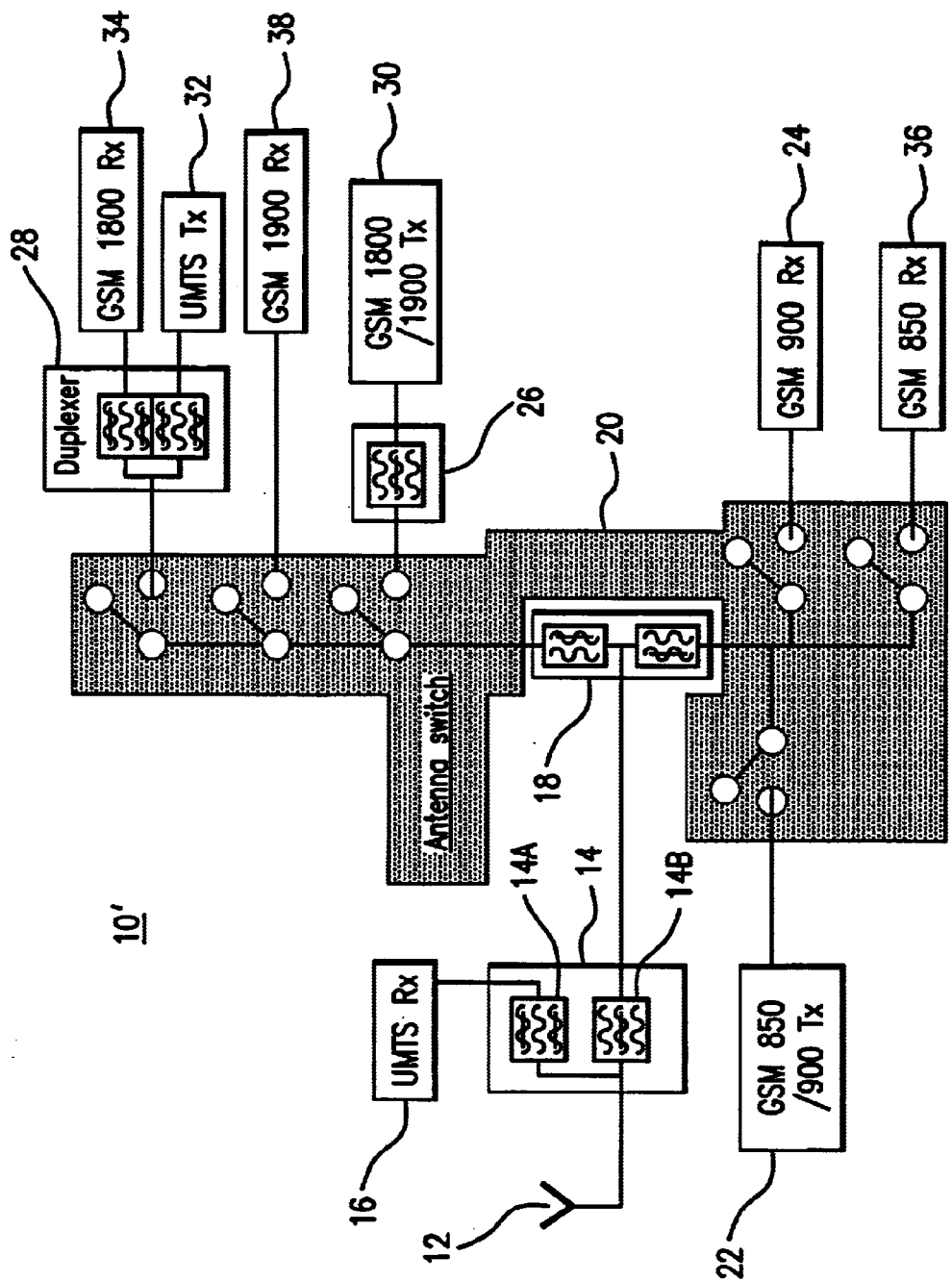
FIG. 4 illustrates a circuit topology for the present invention.

FIG. 4 illustrates an embodiment 10' of the present invention. An antenna 12 is connected to a combination filter 14 that includes a bandpass filter 14A and a first notch filter 14B. The bandpass filter 14A is further connected to a UMTS receiver. The first notch filter 14B rejects the UMTS Rx band. A diplexer 18 connects to the output of the first notch filter 14B and an antenna switch. In a first signal path, the antenna switch 20 connects to either a GSM 850/900 transmitter 22, a GSM 850 receiver 36, or GSM 900 receiver 24. In a second signal path, the antenna switch 20 connects to a second notch filter 26, a GSM 1900 receiver 38, and a duplexer 28. The second notch filter 26 passes the GSM 1800/1900 Tx bands and rejects the UMTS Rx band. The duplexer 28 connects to a UMTS transmitter 32 and a GSM 1800 receiver, discriminating between them.

Figure 5:
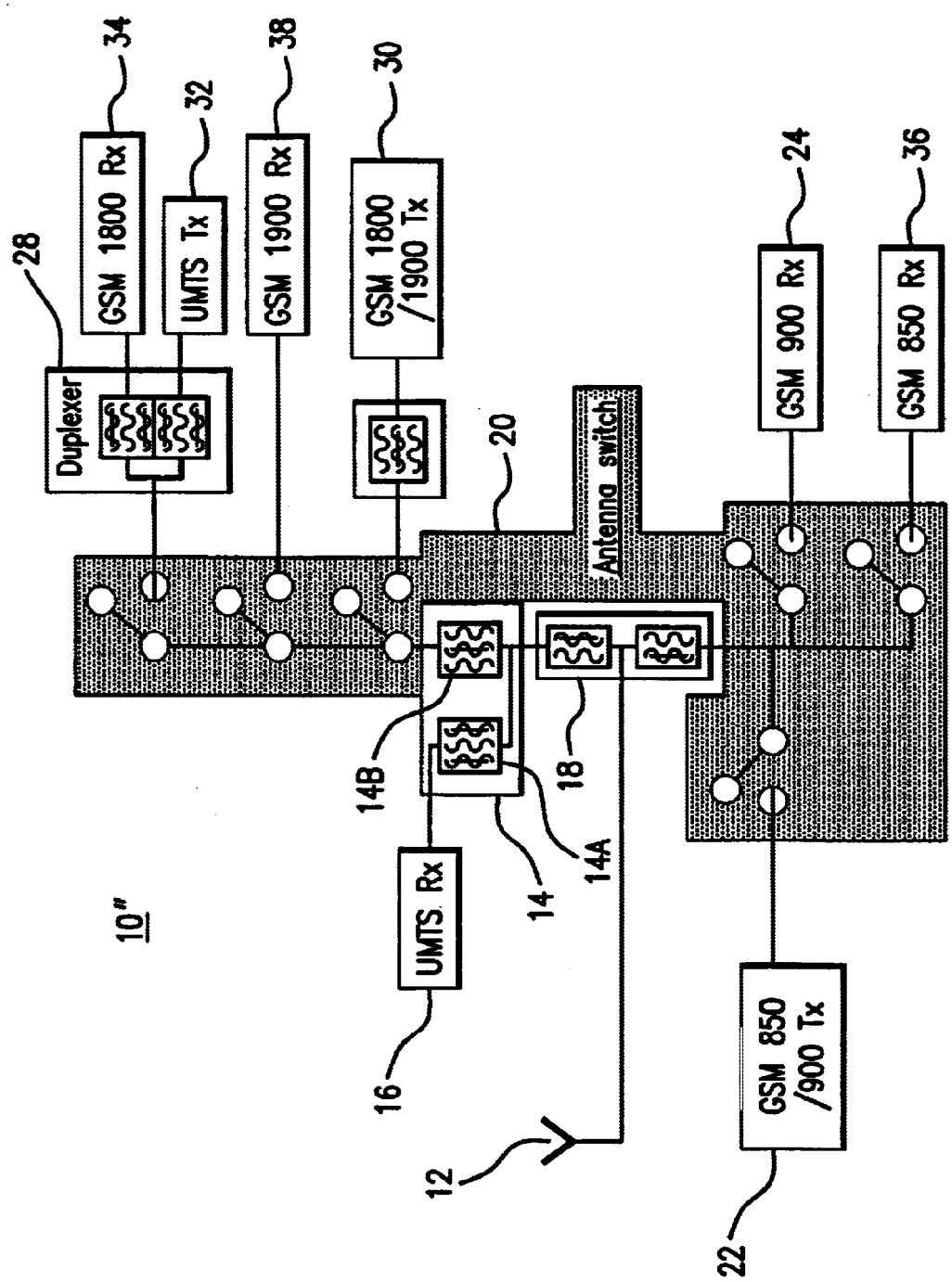
FIG. 5 illustrates a circuit topology for the present invention.

FIG. 5 illustrates an embodiment 10" of the present invention. An antenna 12 connects to a diplexer 18. At one end, the diplexer 18 connects to the combination filter 14. The bandpass filter 14A connects to a UMTS receiver 16. The first notch filter 14B connects to an antenna network 20. The antenna network 20 has a first and a second signal path. The first signal path connects to the GSM 850/900 transmitter 22, the GSM 850 receiver 36, or the GSM 900 receiver 24. The second signal path connects to the second notch filter 26, GSM 1900 receiver 38, or a duplexer 28. The second notch filter 26 connects to the GSM 1800/1900 transmitter 30. The duplexer 28 connects to a UMTS transmitter 32 and a GSM 1800 receiver 34.

Figure 6:
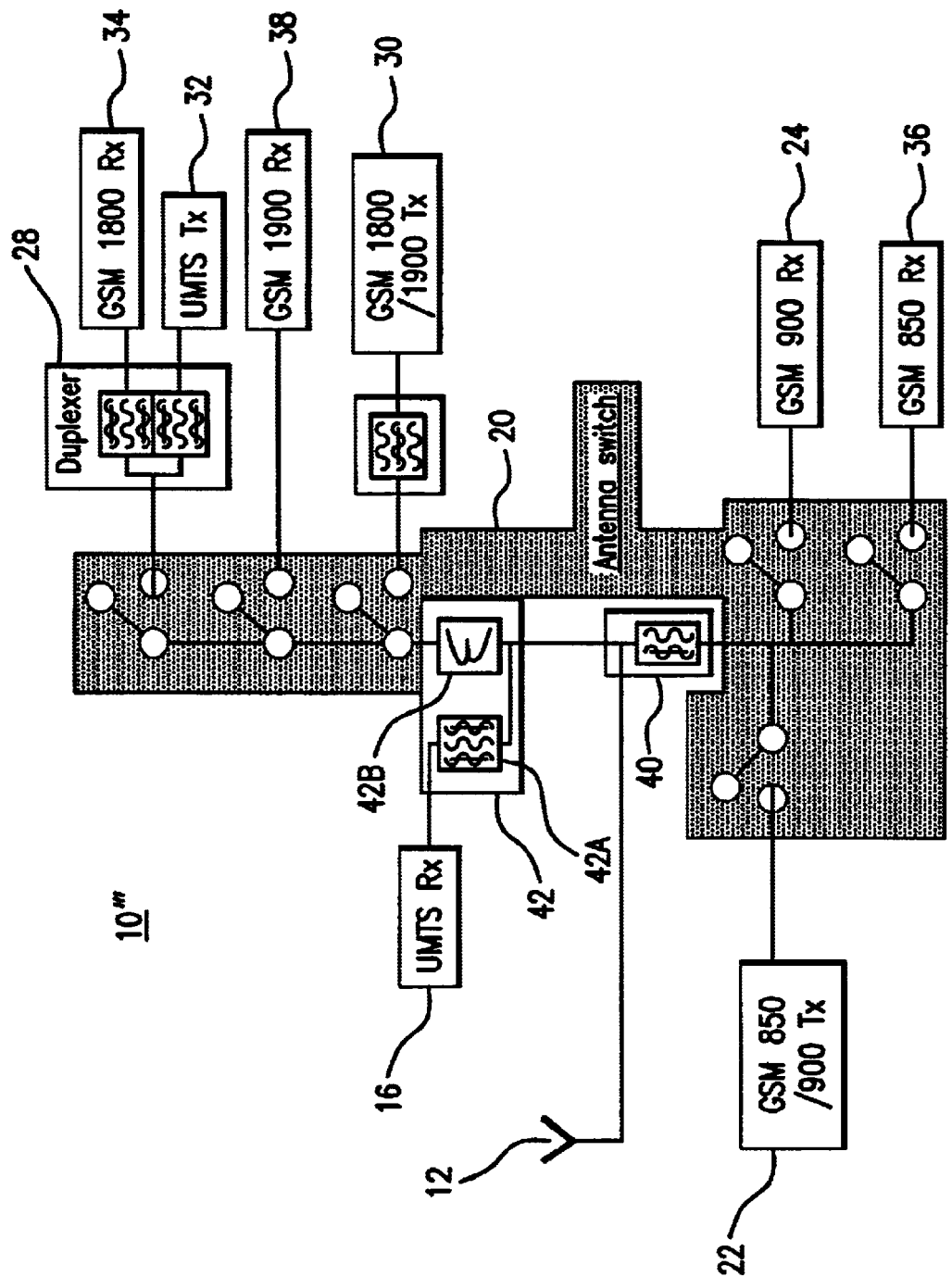
FIG. 6 illustrates a circuit topology for the present invention.

FIG. 6 illustrates an embodiment 10''' of the present invention. An antenna 12 connects to a diplexer 40. At one end, the diplexer 40 connects to the combination filter 42. The bandpass filter 42A connects to a UMTS receiver 16. The first notch filter 42B connects to an antenna network 20. The antenna network 20 has a first and a second signal path. The first signal path connects to the GSM 850/900 transmitter 22, the GSM 850 receiver 36, or the GSM 900 receiver 24. The second signal path connects to the second notch filter 26, GSM 1900 receiver 38, or a duplexer 28. The second notch filter 26 connects to the GSM 1800/1900 transmitter 30. The duplexer 28 connects to a UMTS transmitter 32 and a GSM 1800 receiver 34.

In this embodiment, the diplexer has two paths. One path includes a resonator-based notch filter that rejects the UMTS receive band. The notch filter 42B has the required high pass characteristics that allow it to substitute for the resonator-based notch filter that would normally be in the second path of the diplexer.

I claim:

1. A handset supporting difference frequency bands comprising:
   an antenna transceiving a signal;
   a filter structure connected to a receiver at a first frequency band and the antenna, having two outputs;
   an antenna network having a first path connected to the first filter structure output and a second path connected to the second filter structure output, the first path being connected to a transmitter at a second frequency band and a receiver at the second frequency band;
   a second notch filter, connected to the second path and a transmitter at a third frequency band; and
   a duplexer, connected to the second path, having a first output connected to a transmitter at the first frequency and a second output connected to a receiver at the third frequency band.

2. A handset as in claim 1, wherein the first frequency band is UMTS.

3. A handset as in claim 1, wherein the second frequency band is GSM 900.

4. A handset as in claim 1, wherein the third frequency band is 1805 MHz to 1880 MHz.

5. A handset as in claim 1, wherein:
   the first path connects to a receiver at a fourth frequency band;

the receiver at the second frequency band further receives the fourth frequency band;

the second path connects to a receiver at a fifth frequency band; and the receiver at the third frequency band further receives the fifth frequency band.

6. A handset, as in claim 5, the filter structure comprising:

a bandpass and a first notch filter connected to the antenna, the bandpass filter receiving the first frequency; and a diplexer, connected to the notch filter, having a first and second output.

7. A handset as in claim 6, wherein the third frequency band is GSM 1800 and the fifth frequency band is GSM 1900.

8. A handset as in claim 6, wherein the second frequency band is GSM 900 and the fourth frequency band is GSM 850.

9. A handset, as in claim 5, the filter structure comprising:

a diplexer, connected to the antenna, having a first and second output;

a bandpass filter connected to the antenna, the bandpass filter receiving the first frequency; and a notch filter connected to the bandpass filter and the second diplexer output.

10. A handset as in claim 9, wherein the third frequency band is 1805 MHz to 1880 MHz and the fifth frequency band is GSM 1900.

11. A handset as in claim 9, wherein the second frequency band is GSM 900 and the fourth frequency band is GSM 850.

12. A handset as in claim 5, the filter structure comprising:

a diplexer, connected to the antenna, having the first filter structure output and an output; and a combination bandpass and a notch filter, the notch filter connected to the diplexer output and having the second filter structure output, the bandpass filter connects to the receiver at the first frequency band.

13. A handset as in claim 12, wherein the third frequency band is GSM 1800 and the fifth frequency band is GSM 1900.

14. A handset as in claim 12, wherein the second frequency band is GSM 900 and the fourth frequency band is GSM 850.

* * * * *